(12) United States Patent
Ghosh (10) Patent No.: US 12,249,252 B1
(45) Date of Patent: Mar. 11, 2025

(54) MACHINE LEARNING-BASED ARGUMENT COMPONENT SEGMENTATION

(71) Applicant: Educational Testing Service, Princeton, NJ (US)

(72) Inventor: Debanjan Ghosh, Arlington, MA (US)

(73) Assignee: Educational Testing Service, Princeton, NJ (US)

( * ) Notice: Subject to any disclaimer, the term of this patent is extended or adjusted under 35 U.S.C. 154(b) by 727 days.

(21) Appl. No.: 17/531,915

(22) Filed: Nov. 22, 2021

Related U.S. Application Data (60) Provisional application No. 63/119,008, filed on Nov. 30, 2020.

(51) Int. Cl.
*G06F 40/40* (2020.01)
*G06F 40/284* (2020.01)
*G09B 5/14* (2006.01)

(52) U.S. Cl.
CPC ............ *G09B 5/14* (2013.01); *G06F 40/284* (2020.01); *G06F 40/40* (2020.01)

(58) Field of Classification Search
CPC .......... G09B 5/14; G06F 40/284; G06F 40/40
USPC ........................................................ 704/9
See application file for complete search history.

(56) References Cited

PUBLICATIONS

Ajjour, Yamen, Alshomary, Milad, Wachsmuth, Henning, Stein, Benno; Modeling Frames in Argumentation; Proceedings of the 2019 Conference on Empirical Methods in Natural Language Processing and the 9th International Joint Conference on Natural Language Processing; Hong Kong, China; pp. 2922-2932; Nov. 2019.

Ajjour, Yamen, Chen, Wei-Fan, Kiesel, Johannes, Wachsmuth, Henning, Stein, Benno; Proceedings of the 4th Workshop on Argument Mining; Copenhagen, Denmark; pp. 118-128; Sep. 2017.

Akbik, Alan, Bergman, Tanja, Blythe, Duncan, Rasul, Kashif, Schweter, Stefan, Vollgraf, Roland; Flair: An Easy-to-Use Framework for State-of-the-Art NLP; Proceedings of the NAACL-HLT 2019: Demonstrations; Minneapolis, MN; pp. 54-59; Jun. 2019.

Al-Khatib, Khalid, Wachsmuth, Henning, Kiesel, Johannes, Hagen, Matthias, Stein, Benno; A News Editorial Corpus for Mining Argumentation Strategies; Proceedings of COLING 2016, the 26th International Conference on Computational Linguistics: Technical Papers; Osaka, Japan; pp. 3433-3443; Dec. 2016.

Attali, Yigal, BURSTEIN, Jill; Automated Essay Scoring With E-rater, v.2; Journal of Technology, Learning, and Assessment, 4(3); Feb. 2006.

Beigman Klebanov, Beata, Gyawali, Binod, Song, Yi; Detecting Good Arguments in a Non-Topic-Specific Way: An Oxymoron?; Proceedings of the 55th Annual Meeting of the Association for Computational Linguistics (Short Papers); Vancouver, Canada; pp. 244-249; Aug. 2017.

(Continued)

*Primary Examiner* — Thierry L Pham
(74) *Attorney, Agent, or Firm* — Jones Day (57) ABSTRACT

Data is received that includes a passage of text generated in response to a prompt which comprises a plurality of sentences. Thereafter, the passage of text is tokenized into a plurality of tokens each corresponding to a different word in the passage of text. A first classification head of an adaptive fine-tuned transforms classifies each of the tokens into one of a plurality of classes. A second classification head of the adaptive fine-tuned transformer model classifies each of the sentences as either including or not including an argument. Data can then be provided which characterizes the first and second classifications. Related apparatus, systems, techniques and articles are also described.

20 Claims, 4 Drawing Sheets

(56) References Cited

PUBLICATIONS

Biran, Or, Rambow, Owen; Identifying Justifications in Written Dialogs; 2011 IEEE 5th International Conference on Semantic Computing; pp. 162-168; 2011.

Blanchard, Daniel, Tetreault, Joel, Higgins, Derrick, Cahill, Aoife, Chodorow, Martin; TOEFL11: A Corpus of Non-Native English; Educational Testing Service, Research Report RR-13-24; Nov. 2013.

Caruana, Rich; Multitask Learning; Machine Learning, 28; pp. 41-75; 1997.

Chakrabarty, Tuhin, Hidey, Christopher, McKeown, Kathleen; IMHO Fine-Tuning Improves Claim Detection; Proceedings of the NAACL-HLT 2019; Minneapolis, MN; pp. 558-563; Jun. 2019.

Chakrabarty, Tuhin, Hidey, Christopher, Muresan, Smaranda, McKeown, Kathleen, Hwang, Alyssa; Ampersand: Argument Mining for PERSuAsive oNline Discussions; Proceedings of the Conference on Empirical Methods in Natural Language Processing and the 9th International Joint Conference on Natural Language Processing; Hong Kong, China; pp. 2933-2943; Nov. 2019.

Collins, Michael; Head-Driven Statistical Models for Natural Language Parsing; Computational Linguistics, 29(4); pp. 589-637; 2003.

Correnti, Richard, Matsumura, Lindsay Clare, Wang, Elaine, Litman, Diane, Rahimi, Zahra, Kisa, Zahid; Automated Scoring of Students' Use of Text Evidence in Writing; Reading Research Quarterly, 55(3); pp. 493-520; Jul./Aug./Sep. 2020.

Daxenberger, Johannes, Eger, Steffen, Habernal, Ivan, Stab, Christian, Gurevych, Iryna; What is the Essence of a Claim? Cross-Domain Claim Identification; Proceedings of the 2017 Conference on Empirical Methods in Natural Language Processing; Copenhagen, Denmark; pp. 2055-2066; Sep. 2017.

Devlin, Jacob; Chang, Ming-Wei, LEE, Kenton, Toutanova, Kristina; Bert: Pre-Training of Deep Bidirectional Transformers for Language Understanding; Proceedings of the Conference of the North American Chapter of the Association for Computational Linguistics: Human Language Technologies, vol. 1; Minneapolis, MN; pp. 4171-4186; Jun. 2019.

Eger, Steffen, Daxenberger, Johannes, Gurevych, Iryna; Neural End-to-End Learning for Computational Argumentation Mining; Proceedings of the 55th Annual Meeting of the Association for Computational Linguistics; Vancouver, Canada; pp. 11-22; Jul./Aug. 2017.

Farra, Noura, Somasundaran, Swapna, Burstein, Jill; Scoring Persuasive Essays Using Opinions and Their Targets; Proceedings of the 10th Workshop on Innovative Use of NLP for Building Educational Applications; Denver, CO; pp. 64-74; Jun. 2015.

Feng, Vanessa Wei, Hirst, Graeme; Classifying Arguments by Scheme; Proceedings of the 49th Annual Meeting of the Association for Computational Linguistics; pp. 987-996; 2011.

Ghosh, Debanjan, Beigman Klebanov, Beata, Song, Yi; An Exploratory Study of Argumentative Writing by Young Students: A Transformer-based Approach; Proceedings of the 15th Workshop on Innovative Use of NLP for Building Educational Applications; pp. 145-150; Jul. 2020.

Gururangan, Suchin, Marasovic, Ana, Swayamdipta, Swabha, Lo, Kyle, Beltagy, Iz, Downey, Doug, Smith, Noah; Don't Stop Pretraining: Adapt Language Models to Domains and Tasks; Proceedings of the 58th Annual Meeting of the Association for Computational Linguistics; pp. 8342-8360; Jul. 2020.

Hou, Yufang, Jochim, Charles; Argument Relation Classification Using a Joint Inference Model; Proceedings of the 4th Workshop on Argument Mining; Copenhagen, Denmark; pp. 60-66; Sep. 2017.

Hua, Xinyu, Hu, Zhe, Wang, Lu; Argument Generation with Retrieval, Planning, and Realization; Proceedings of the 57th Annual Meeting of the Association for Computational Linguistics; Florence, Italy; pp. 2661-2672; 2019.

Kendall, Alex, Gal, Yarin, Cipolla, Roberto; Multi-Task Learning Using Uncertainty to Weigh Losses for Scene Geometry and Semantics; Proceedings of the IEEE Conference on Computer Vision and Pattern Recognition; pp. 7482-7491; 2018.

Krippendorff, Klaus; Measuring the Reliability of Qualitative Text Analysis Data; Quality and Quantity, 38(6); pp. 787-800; Dec. 2004.

Lafferty, John, McCallum, Andrew, Pereira, Fernando; Conditional Random Fields: Probabilistic Models for Segmenting and Labeling Sequence Data; Proceedings of the 18th International Conference on Machine Learning; San Francisco, CA; pp. 282-289; 2001.

Lawrence, John, Reed, Chris; Argument Mining: A Survey; Computational Linguistics, 45(4); pp. 765-818; 2020.

Lippi, Marco, Torroni, Paolo; Context-Independent Claim Detection for Argument Mining; Proceedings of the 24th International Joint Conference on Artificial Intelligence; pp. 185-191; 2015.

Liu, Xiaodong, He, Pengcheng, Chen, Weizhu, Gao, Jianfeng; Multi-Task Deep Neural Networks for Natural Language Understanding; Proceedings of the 57th Annual Meeting of the Association for Computational Linguistics; Florence, Italy; pp. 4487-4496; Jul./Aug. 2019.

Ma, Xuezhe, Hovy, Eduard; End-to-End Sequence Labeling via Bi-Directional LSTM-CNNs-CRF; Proceedings of the 54th Annual Meeting of the Association for Computational Linguistics; Berlin, Germany; pp. 1064-1074; Aug. 2016.

Madnani, Nitin, Heilman, Michael, Tetreault, Joel; Identifying High-Level Organizational Elements in Argumentative Discourse; 2012 Conference of the North American Chapter of the Association for Computational Linguistics: Human Language Technologies; Montreal, Canada; pp. 20-28; Jun. 2012.

Mochales, Raquel, Moens, Marie-Francine; Argumentation Mining; Artificial Intelligence and Law, 19(1); pp. 1-22; Apr. 2011.

Moens, Marie-Francine, Boiy, Erik, Palau, Raquel Mochales, Reed, Chris; Automatic Detection of Arguments in Legal Texts; Proceedings of the 11th International Conference on Artificial Intelligence and Law; pp. 225-230; Jun. 2007.

Nguyen, Huy, Litman, Diane; Context-Aware Argumentative Relation Mining; Proceedings of the 54th Annual Meeting of the Association for Computational Linguistics; Berlin, Germany; pp. 1127-1137; Aug. 2016.

Niculae, Vlad, Park, Joonsuk, Cardie, Claire; Argument Mining with Structured SVMs and RNNs; Proceedings of the 55th Annual Meeting of the Association for Computational Linguistics; Vancouver, Canada; pp. 985-995; Jul./Aug. 2017.

Palau, Raquel Mochales, Moens, Marie-Francine; Argumentation Mining: The Detection, Classification, and Structure of Arguments in Text; Proceedings of the 12th International Conference on Artificial Intelligence and Law; New York, NY; pp. 98-107; 2009.

Park, Joonsuk, Cardie, Claire; Identifying Appropriate Support for Propositions in Online User Comments; Proceedings of the 1st Workshop on Argumentation Mining; Baltimore, MD; pp. 29-38; Jun. 2014.

Peldszus, Andreas, Stede, Manfred; From Argument Diagrams to Argumentation Mining in Texts: A Survey; International Journal of Cognitive Informatics and Natural Intelligence, 7(1); pp. 1-31; Jan.-Mar. 2013.

Peldszus, Andreas, Stede, Manfred; Joint Prediction in MST-Style Discourse Parsing for Argumentation Mining; Proceedings of the 2015 Conference on Empirical Methods in Natural Language Processing; Lisbon, Portugal; pp. 938-948; Sep. 2015.

Persing, Isaac, NG, Vincent; Modeling Prompt Adherence in Student Essays; Proceedings of the 52nd Annual Meeting of the Association for Computational Linguistics; Baltimore, MD; pp. 1534-1543; Jun. 2014.

Persing, Isaac, NG, Vincent; Modeling Argument Strength in Student Essays; Proceedings of the 53r Annual Meeting of the Association for Computational Linguistics and the 7th International Joint Conference on Natural Language Processing; Beijing, China; pp. 543-552; Jul. 2015.

Persing, Isaac, NG, Vincent; End-to-End Argumentation Mining in Student Essays; Proceedings of the 2016 Conference of the North American Chapter of the Association for Computational Linguistics: Human Language Technologies; pp. 1384-1394; Jun. 2016.

Petasis, Georgios; Segmentation of Argumentative Texts with Contextualised Word Representations; Proceedings of the 6th Workshop on Argument Mining; Florence, Italy; pp. 1-10; Aug. 2019.

(56) References Cited

PUBLICATIONS

Potash, Peter; Romanov, Alexey, Rumshisky, Anna; Here's My Point: Joint Pointer Architecture for Argument Mining; Proceedings of the 2017 Conference on Empirical Methods in Natural Language Processing; Copenhagen, Denmark; pp. 1364-1373; Sep. 2017.

Rooney, Niall, Wang, Hui, Browne, Fiona; Applying Kernel Methods to Argumentation Mining; Proceedings of the 25th International Florida Artificial Intelligence Research Society Conference, vol. 172; pp. 272-275; May 2012.

Somasundaran, Swapna, Riordan, Brian, Gyawali, Binod, Yoon, Su-Youn; Evaluating Argumentative and Narrative Essays Using Graphs; Proceedings of COLING 2016, the 26th International Conference on Computational Linguistics: Technical Papers; Osaka, Japan; pp. 1568-1578; Dec. 2016.

Song, Yi, Heilman, Michael, Beigman Klebanov, Beata, Deane, Paul; Applying Argumentation Schemes for Essay Scoring; Proceedings of the 1st Workshop on Argumentation Mining; Baltimore, MD; pp. 69-78; Jun. 2014.

Stab, Christian, Gurevych, Iryna; Identifying Argumentative Discourse Structures in Persuasive Essays; Proceedings of the 2014 Conference on Empirical Methods in Natural Language Processing (EMNLP); Doha, Qatar, pp. 46-56; Oct. 2014.

Stab, Christian, Gurevych, Iryna; Parsing Argumentation Structures in Persuasive Essays; Computational Linguistics, 43(3); pp. 619-659; Sep. 2017.

Stede, Manfred, Schneider, Jodi; Argumentation Mining; Synthesis Lectures on Human Language Technologies, 11(2); pp. 1-191; Dec. 2018.

Should Artificial Sweeteners be Banned in America?

Diet soda, sugar-free gum, and low-calorie sweeteners are what most people see as a way to sweeten up a day without the calories.

Despite the lack of calories, artificial sweeteners have multiple negative health effects.

Over the past century, science has made it possible to replicate food with fabricated alternatives that simplify weight loss.

Although many thought these new replacements would benefit overall health, there are more negative effects on manufactured food than the food they replaced.

Artificial sweeteners have a huge impact on current day society.

Legends: B-Claim I-Claim B-Premise I-Premise O-Arg

MACHINE LEARNING-BASED ARGUMENT COMPONENT SEGMENTATION

RELATED APPLICATION

The current application claims priority to U.S. Pat. App. Ser. No. 63/119,008 filed on Nov. 30, 2020, the contents of which are hereby fully incorporated by reference.

TECHNICAL FIELD

The subject matter described herein relates to techniques for argument component segmentation with particular application to student essays.

BACKGROUND

Argument mining focuses on the detection of argumentative components and argumentative structures in text. A key subtask in argument mining research is to identify the argument components such as claim and premise as well as the relationship between the argument components, such as identifying agreement (supports) and disagreement (attacks). Argument mining can be used to assess student writing skills in essay scoring so that feedback can be provided to the students.

SUMMARY

In a first aspect, data is received that includes a passage of text generated in response to a prompt which comprises a plurality of sentences. Thereafter, the passage of text is tokenized into a plurality of tokens each corresponding to a different word in the passage of text. A first classification head of an adaptive fine-tuned transforms classifies each of the tokens into one of a plurality of classes. A second classification head of the adaptive fine-tuned transformer model classifies each of the sentences as either including or not including an argument. Data can then be provided which characterizes the first and second classifications.

Providing data can include at least one of: causing the provided data to be displayed in an electronic visual display, transmitting the provided data to a remote computing device, storing the provided data in physical persistence, or loading the provided data into memory.

In addition or in the alternative, providing data can include annotating the passage of text with the classifications from the first classifying and the second classifying and causing the annotated passage of text to be displayed in a graphical user interface rendered on an electronic visual display.

The transformer model can be a bidirectional encoder representation from transformers (BERT) model. The BERT model can be first trained using a corpus of text generated by authors above an age and subsequently trained using an argumentative corpus of text generated by authors below the age. The second classifying can classify each tokenized word into one of five beginning inside out (BIO) classes.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced natural language processing techniques that can better characterize textual content.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to advance techniques for characterizing written text for various applications including computer-based natural language processing. Argument mining is often addressed by a pipeline method where segmentation of text into argumentative units is conducted first and succeeded by an argument component identification task. With the current subject matter, a token-level classification is applied to identify claim and premise tokens from a new corpus of essays (and in this case argumentative essays) written by middle school students. To demonstrate the advantages of the current subject matter, a variety of state-of-the-art models such as discrete features and deep learning architectures (e.g., BiLSTM networks and BERT-based architectures) to identify the argument components were analyzed. The results demonstrate that a BERT-based multi-task learning architecture (i.e., token and sentence level classification), as provided herein, that is adaptively pretrained on a relevant unlabeled dataset obtains the best results.

Computational argument mining focuses on subtasks such as identifying the Argumentative Discourse Units (ADUs), their nature (i.e., claim or premise), and the relation (i.e., support/attack) between them. Argumentation is essential in academic writing as it enhances the logical reasoning, as well as, critical thinking capacities of students. Thus, in recent times, argument mining has been used to assess students' writing skills in essay scoring and provide feedback on the writing.

While argument mining literature has addressed students writing in the educational context, so far, it has primarily addressed college level writing except for a very few ones. With the current subject matter, arguments from essays written by middle school students can be identified. A new corpus of 145 argumentative essays written by middle school students was analyzed to identify argument components.

Normally, research that investigates college students writing in the context of argument mining apply a pipeline of subtasks to first detect arguments at the token-level text units and subsequently classify the text units to argument components. However, middle school student essays are vastly different from college students' writing (as provided below). As such, middle school student essays are more difficult to analyze through the pipeline approach due to run-on sentences, unsupported claims, and the presence of several claims in a sentence. Thus, as provided herein, instead of segmenting the text into argumentative/non-argumentative units first, a token-level classification task is conducted to identify the type of the argument component (e.g., B/I tokens from claims and premises) directly by joining the first and the second subtask in a single task.

Figure 1:
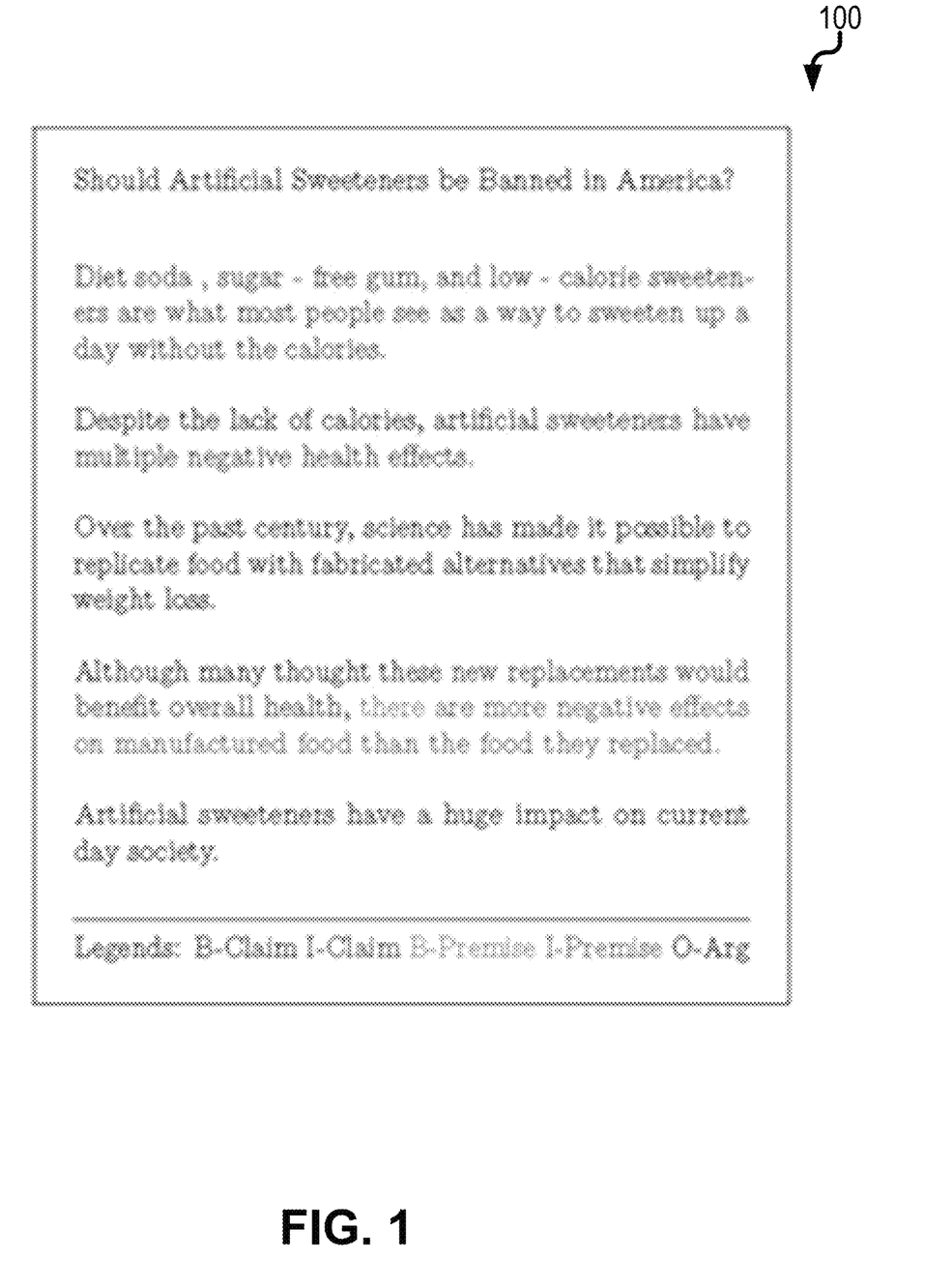
FIG. 1 is an excerpt from an annotated essay with claim segments noted.

FIG. 1 is a diagram 100 that illustrates an excerpt from an annotated essay with their corresponding gold annotations of claims (e.g., "Diet soda . . . the calories") and premises (e.g., \there are . . . replaced"). The legends represent the tokens by the standard BIO notations.

With the current subject matter, an experimental setup was utilized to identify the argument components using both feature-based machine learning techniques and deep learning models. For the former, several structural, lexical, and syntactic features were used in a sequence classification framework using a model such as the Conditional Random Field (CRF) classifier. For the latter, a BiLSTM network and, additionally, a transformer architecture-BERT with its pretrained and task-specific fine-tuned models was used. Results from a particular BERT architecture (7.5% accuracy improvement over the discrete features) was used that employs a joint multitask learning objective with an uncertainty-based weighting of two task-specific losses: (a) the main task of token-level sequence classification, and (b) the auxiliary task of sentence classification (i.e., whether a sentence contains argument or not).

The current subject matter was based on a large number of English essays (over 10 K) obtained through the Writing Mentor Educational App. This App is a word processor add-on designed to provide instructional writing support, especially for academic writing. The add-on provides students to write argumentative or narrative essays and receive feedback on their writings. A subset of 145 argumentative essays were considered for the annotation purpose. Essays were either self-labeled as "argumentative" or annotators identified their argumentative nature from the titles (e.g., "Should Artificial Sweeteners be Banned in America?"). Essays covered various social issues related to climate change, veteran care, effects of wars, whether sharks are dangerous or not, etc. This corpus us denoted herein as ARG2020. In order to validate and train the models used herein, three expert annotators (with academic and professional background in Linguistics and Education) were employed to identify the argument components. The annotators were instructed to read sentences from the essays and identify the claims (defined as, "a potentially arguable statement that indicates a person is arguing for or arguing against something. Claims are not clarification or elaboration statements.") that the argument is in reference to. Next, once the claims are identified, the annotators annotated the premises (defined as, reasons given by either for supporting or attacking the claims making those claims more than mere assertions"). Earlier research has addressed college level writing such as the Stab and Gurevych, 2017 corporate referred to herein as SG2017. On the contrary, ARG2020 is based on middle school students writing, which differs from college level writing SG2017 in several aspects as described below.

First, it was noticed that essays in SG2017 maintain distinct paragraphs such as the introduction (initiates the major claim in the essay), the conclusion (summarizes the arguments), and a few paragraphs in between that express many claims and their premises. However, essays written by middle school students do not always comply with such writing conventions to keep a concrete introduction and conclusion paragraph, rather, they write many short paragraphs (7-8 paragraphs on average) per essay while each paragraph contains multiple claims. Second, in general, claims in college essays in SG2017 are justified by one or multiple premises, whereas ARG2020 has many unsupported claims. For instance, the excerpt from the annotated essay in FIG. 1 contains two unsupported claims (e.g., "Diet soda, sugar . . . without the calories" and "artificial sweeteners . . . health effects"). Third, middle school students often put opinions (e.g., "Sugar substitutes produce sweet food without feeling guilty consequences") or matter-of-fact statements (e.g., "Even canned food and dairy products can be artificially sweetened") that are not argumentative claims but structurally they are identical to claims. Fourth, multiple claims frequently appear in a single sentence that are separated by discourse markers or commas. Fifth, many essays contain run-on sentences (e.g., "this is hard on the family, they have a hard time adjusting") that make the task of parsing even tricky. These are examples of why identifying argument claims and premises from ARG2020 is technically challenging.

The annotators were presented with specific guidelines and examples for annotation. A pilot task was first conducted in which all three annotators annotated ten essays and exchanged their notes for calibration. Following that, pairwise annotation tasks (30 essays for each pair of annotators) were performed followed by individual annotators who annotated the remaining essays. As the annotation task involved identifying each argumentative component's words, fuzzy boundaries (e.g., in-claim vs. not-in-claim tokens) were considered to measure the IAA. In one example, Krippendorff's $\alpha$ metric was used to compute the IAA. The $\alpha$ between each pair of annotators and report the average was measured. For claim, there was a modest agreement of 0.71 and for premise, there was a high agreement of 0.90.

Out of the 145 essays from ARG2020, 100 essays were randomly identifier for training, 10 essays for dev, and the remaining 35 essays for test. Table 1 represents the data statistics in the standard BIO format. It was found that the number of claims is almost six times the number of premises showing that the middle school students often fail to justify their proposed claims.

TABLE 1

Token counts of each category in the training, dev, and test sets of ARG2020

| Corpora | Split | Essays | B-Claim | I-Claim | B-Premise | I-Premise | O-Arg | Total |
|---|---|---|---|---|---|---|---|---|
| ARG2020 | training | 100 | 1,780 | 21,966 | 317 | 3,552 | 51,478 | 79,093 |
|  | dev | 10 | 171 | 1,823 | 32 | 371 | 4,008 | 6,405 |
|  | test | 35 | 662 | 8,207 | 92 | 1,018 | 14,987 | 24,966 |

Feature-based Models. Three groups of discrete features: structural, syntactic and lexico-syntactic were analyzed with some modifications. In addition, embedding features extracted from the contextualized pretrained language model of BERT were also utilized.

Discrete Features. For each token in a given essay, structural features can be extracted that include token position (e.g., the relative and absolute position of the token in the sentence, paragraph and, essay from the beginning of the essay) and punctuation features (e.g., whether the token is, preceded, or succeeded by punctuation). Such position features are useful in identifying claims and premises against sentences that do not contain any argument. Syntactic features can also be extracted for each token that include part-of-speech tag of the token and normalized length to the lowest common ancestor (LCA) of the token and its preceding (and succeeding) token in the parse tree. Dependency parsing can be used as the base for the syntactic features rather than constituency parsing. In addition, lexico-syntactic features (denoted as lexSyn in Table 2) are extracted that include the dependency relation governing the token in the dependency parse tree and the token itself, plus its governing dependency relation as another feature. Such features are effective in identifying the argumentative discourse units. It was also observed that using dependency parse trees as a basis for the lexico-syntactic features yields better results than constituency parse trees in certain pilot experiments.

Embedding Features from BERT. A BERT model (i.e., a bi-directional transformer model, etc.) "BERT" can be initially trained on the tasks of masked language modeling (MLM) and next sentence prediction (NSP) over very large corpora of English Wikipedia and BooksCorpus. With the current subject matter, during training of BERT, a special token "[CLS]" can be added to the beginning of each training instance, and "[SEP]" tokens can be added to indicate the end of utterance(s) and separate, in case of two utterances.

Pretrained BERT ("bert-base-uncased") can be used directly by extracting the token representations' embeddings. Average embeddings of the top four layers can be used. For tokens with more than one word-piece when running BERT's to-kenizer, their final embeddings feature can be the average vector of all of their word-pieces. This feature yields a 768D-long vector that was used individually as well as in combination with the other discrete features in the experiments. CRF analysis can be performed by various tools including the sklearn-crfsuite.

Standard BERT ("bert-base-uncased") embeddings (768D) in the embedding layer can be used and projected to a single-layer BILSTM of 256D. BiLSTMs provide the context to the token's left and right, which can be useful for sequence tagging tasks. The model can be trained with and without a CRF decoder to see its effect on this task. The CRF layer can consider both the output of the BiL-STM layer and the other neighboring tokens' labels, which improves the accuracy of the modeling desired transitions between labels.

Pretrained BERT can also be used for transfer learning by fine-tuning on a downstream task, i.e., claim and premise token identification task where training instances are from the labeled dataset ARG2020. This model is denoted herein as $BERT_{bl}$. Besides fine-tuning with the labeled data, a multitask learning setting can be used to provide adaptive pretraining (i.e., that is continued pretraining on unlabeled corpora that can be task and domain relevant, etc.).

Transformers Multitask Learning. Multitask learning aims to leverage useful information in multiple related tasks to improve the performance of each task. With the current subject matter, the sequence labeling task of five-way token-level argument classification is treated as the main task while the binary task of sentence-level argument identification (i.e., whether the candidate sentence contains an argument) was adopted as the auxiliary task. Here, if any sentence in the candidate essay contains claim or premise token(s), the sentence is labeled as the positive category (i.e., argumentative), otherwise non-argumentative. This auxiliary task of identifying argumentative sentences in a multitask setting was determined to improve the accuracy for the main task of token-level classification.

Two classification heads form part of the transformer model-one for each task—and the relevant gold labels can be passed to them. For the auxiliary task, the learned representation for the "[CLS]" token can be passed to the classification head. The two losses from these individual heads can be added and propagated back through the model. This allows BERT to model the nuances of both tasks and their interdependence simultaneously. However, instead of simply adding the losses from the two tasks, dynamic weighting of task-specific losses can be employed during the training process, based on the homoscedastic uncertainty of tasks:

$$L = \sum_t \frac{1}{2\sigma_t^2} L_t + \log \sigma_t^2 \qquad (1)$$

where $L_t$ and $a_t$ depict the task-specific loss and its variance (updated through backpropagation), respectively, over the training instances. This model is denoted herein as $BERT_{mt}$.

Adaptive Pretraining Learning. BERT can be adaptively pretrained over two unlabeled corpora. First, BERT can be trained on a task relevant Reddit corpus of 5.5 million opinionated claims. These claims are self-labeled by the acronym: IMO/IMHO (in my (humble) opinion), which is commonly used in Reddit. This model is denoted herein as $BERT_{INHO}$. Next, BERT can be trained on a task and domain relevant corpus of around 10K essays that were obtained from the Writing Mentor App, excluding the annotated set of ARG2020 essays. This model can be denoted as $BERT_{essay}$.

Figure 2:
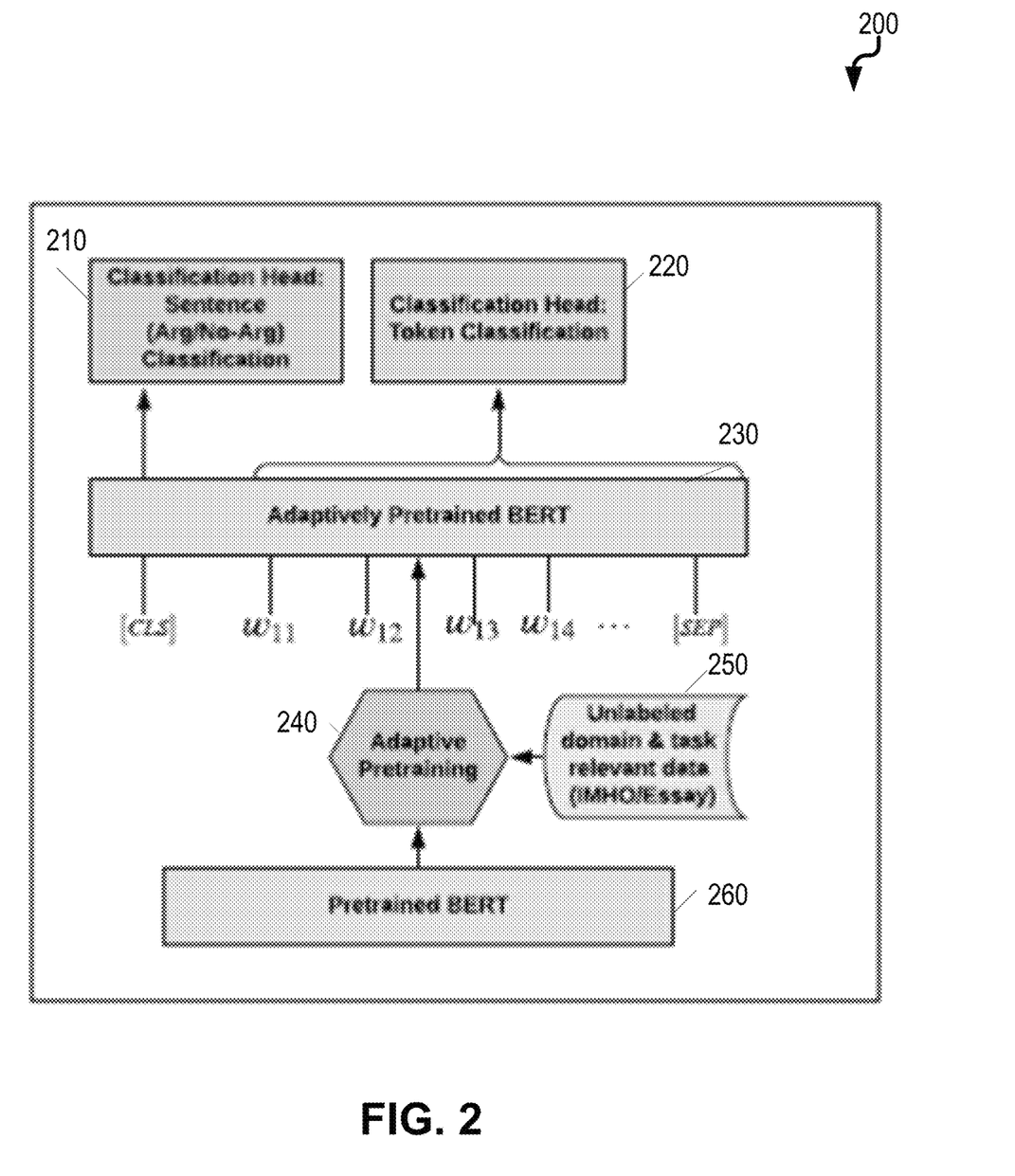
FIG. 2 is a diagram illustrating BERT fine-tuning with adaptive pretraining on unlabeled data from a relevant domain followed by fine-tuning on a labeled dataset with the multitask variation.

FIG. 2 is a diagram 200 that illustrates the use of the adaptive pretraining step 240 and the two classification heads 210, 220 employed for the multitask variation. Starting with a pretrained model 260 such as BERT, the adaptive pretraining 240 operation is then conducted using unlabeled domain and task relevant data 250 to result in an adaptively pretrained model (e.g., an adaptively pretrained BERT model, etc.). A first classification head 210 can analyze sentences as input can classify such sentences in received text as including an argument/non-argument. A second classification head 220 can classify tokenized words forming part of sentences in the received text. Such classification can include, for example, assigning BIO notation to some or all of the words in the received text.

For brevity, the parameter tuning description for all the models and experiments-discrete feature-based and deep-learning ones (e.g., CRF, BILSTM, BERT) is in the supplemental material.

augmented with the discrete features which resulted in a marginal improvement in the accuracy score (less than 1%) over the performance of lexSyn features. This improvement is achieved from the higher accuracy in detecting the claim terms (e.g., Embedding+Discrete*achieves around 17% and 10%, an improvement over Discrete*features in the case of B-Claim and I-Claim, respectively). However, the accuracy of detecting the premise tokens is still significantly low. This lower accuracy could be the result of the low frequency of premises in the training set, which seems to be more challenging for the CRF model to learn useful patterns from the pretrained embeddings. On the contrary, the O-Arg token is the most frequent in the essays and that is reflected in the overall high accuracy scores for the O-Arg tokens (i.e., over 76% on average).

TABLE 2

| | CRF | | | | | | |
|---|---|---|---|---|---|---|---|
| Features | B-claim | I-claim | B-premise | I-premise | O-Arg | Acc. | F1 |
| lexSyn | .395 | .530 | .114 | .176 | .768 | .673 | .397 |
| Discrete* | .269 | .504 | 0 | .013 | .695 | .595 | .296 |
| Embedding | .401 | .560 | .048 | .139 | .769 | .676 | .384 |
| Embedding + lexSyn | .482 | .610 | .134 | .180 | .764 | .682 | .434 |
| Embedding + Discrete* | .434 | .593 | .055 | .152 | .762 | .676 | .399 |

| | BiLSTM | | | | | | |
|---|---|---|---|---|---|---|---|
| Setup | B-claim | I-claim | B-premise | I-premise | O-Arg | Acc. | F1 |
| BiLSTM | .556 | .680 | .239 | .438 | .797 | .735 | .542 |
| BiLSTM-CRF | .558 | .676 | .199 | .378 | .789 | .727 | .520 |

| | BERT | | | | | | |
|---|---|---|---|---|---|---|---|
| Setup | B-claim | I-claim | B-premise | I-premise | O-Arg | Acc. | F1 |
| $BERT_{bl}$ | .563 | .674 | .274 | .425 | .795 | .728 | .546 |
| $BERT_{bl_{IMHO}}$ | .571 | .681 | .304 | .410 | .795 | .730 | .540 |
| $BERT_{bl_{essay}}$ | .564 | .676 | .261 | .406 | .792 | .747 | .561 |
| $BERT_{mt}$ | .567 | .685 | .242 | .439 | .805 | .741 | .548 |
| $BERT_{mt_{IMHO}}$ | .562 | .684 | .221 | .413 | .794 | .731 | .534 |
| $BERT_{mt_{essay}}$ | .580 | .702 | .254 | .427 | .810 | .752 | .574 |

Table 2 illustrates F1 scores for Claim and Premise Token Detection on the test set.
Underlined: highest Accuracy/F1 in group.
Bold: highest Accuracy/F1 overall.
*Discrete" includes structural, syntactic, and lexSyn features.

Presented below are experimental results using the CRF, BILSTM, and BERT models under different settings. Reported are the individual F1, Accuracy, and Macro-F1 (abbrev. as "Acc." and "F1") scores for all the categories in Table 2 and Table 3.

Discrete features (structural, syntactic, lexico-syntactic ("lexSyn")) were applied together and individually to the CRF model. Table 2 illustrates discrete features and individually only the performance of the lexSyn features. It has been noted that structural features are effective to identify argument components, especially from the introduction and conclusion sections of the college level essays because they contain few argumentatively relevant content. On the contrary, as stated above, school student essays do not always comply with such writing conventions.

Table 2 displays that the lexSyn feature independently performs better by almost 8% accuracy than the combination of the other discourse features. This correlates to the findings from prior work on SG2017 where the lexSyn features reached the highest F1 on a similar corpus. Next, the embedding features from the BERT pretrained model were Table 2 illustrates F1 scores for Claim and Premise Token Detection on the test set. Underlined: highest Accuracy/F1 in group. Bold: highest Accuracy/F1 overall. *Discrete: includes structural, syntactic, and lexSyn features.

The overall performance(s) improved when the BiLSTM networks were applied on the test data. Accuracy improved by 5.3% in the case of BILSTM against the Embeddings+lexSyn features. However, results do not improve when the CRF classifier was augmented on top of the LSTM networks (BiLSTM-CRF). Instead, the performance drops by 0.8% accuracy (See Table 2).

In the case of BERT based experiments, it was observed that $BERT_{bl}$, obtains an accuracy of 73% that is comparable to the BiLSTM performance. In terms of the individual categories, it was observed that $BERT_{bl}$ achieves around 7.5% improvement over the BiLSTM-CRF classifier for the B-Premise tokens. It was also observed that the two adaptive-pretrained models (e.g., $BERT_{IMHO}$ and $BERT_{essay}$) perform better than the $BERT_{bl}$ where $BERT_{essay}$ achieves the best accuracy of 74.7%, a 2% improvement over $BERT_{bl}$. Although $BERT_{IMHO}$ was trained on a much larger corpus than BERT$_{essay}$, it is assumed that since BERT$_{essay}$ was trained on a domain relevant corpus it achieves the highest F1. Likewise, in the case of multitask models, it was observed that BERT$_{mt}$ performs better than BERT$_{bl}$ by 1.3%. This shows that using argumentative sentence identification as an auxiliary task is beneficial for token-level classification. With regards to the adaptive-pretrained models, akin to the BERT$_{bl}$ based experiments, it was observed that BERTmt$_{essay}$ performs best by achieving the highest accuracy over 75%.

Argument Segmentation. A five-way token-level classification of argument component was selected as the standard pipeline approach because the standard level of granularity (sentence or clause-based) is not applicable to the training data for needed to implement the current subject matter. Any token that is not "B-Claim", "I-Claim", "B-Premise", or "I-Premise" is denoted as "O-Arg". In order to test the benefit of the five-way token-level classification, it was compared against an approach of segmentation of argumentative units into argumentative and non-argumentative tokens. The models were configured to use the standard BIO notation for a three-way token classification setup (B-Arg, I-Arg, and O-Arg) for argument segmentation. In this setup, the B-Claim and B-Premise classes are merged into B-Arg, and I-Claim and I-Premise are merged into I-Arg, while the O-Arg class remains unchanged. The results of all of the current models on this task are shown in Table 3. It is noticed that there are similar patterns (except for BERTmt$_{INHO}$ that performs better than BERTmt this time) in this three-way classification task as seen in the five-way classification. The best model remains to be the BERTmt$_{essay}$ with 77.3% accuracy, which is an improvement of 2-3% over the BiLSTM and other BERT-based architecture.

There are two main observations from Table 2 and Table 3. First, the best model in Table 3 reports only about 3% improvement over the result from Table 2 which shows that the five-way token-level classification is comparable against the standard task of argument segmentation. Second, the accuracy of the argument segmentation task is much lower than the accuracy of college-level essay corpus SG2017. This result supports the technical challenges of analyzing middle school student essays.

TABLE 3

| | CRF | | | | |
|---|---|---|---|---|---|
| Features | B-Arg | I-Arg | O-Arg | Acc. | F1 |
| lexSyn | .385 | .518 | .768 | .683 | .557 |
| Discrete | .288 | .493 | .710 | .625 | .497 |
| Embeddings | .379 | .596 | .767 | .699 | .581 |
| Emb + lexSyn | .468 | .622 | .768 | .708 | .619 |
| Emb + Discrete | .381 | .599 | .767 | .699 | .582 |

| | BiLSTM | | | | |
|---|---|---|---|---|---|
| Setup | B-Arg | I-Arg | O-Arg | Acc. | F1 |
| BiLSTM | .546 | .730 | .792 | .759 | .689 |
| BiLSTM-CRF | .553 | .707 | .793 | .752 | .684 |

| | BERT | | | | |
|---|---|---|---|---|---|
| Setup | B-Arg | I-Arg | O-Arg | Acc. | F1 |
| BERT$_{bl}$ | .567 | .698 | .795 | .750 | .687 |
| BERT$_{bl_{IMHO}}$ | .558 | .717 | .778 | .744 | .684 |
| BERY$_{bl_{essay}}$ | .567 | .707 | .795 | .754 | .690 |
| BERT$_{mt}$ | .555 | .702 | .803 | .758 | .688 |

TABLE 3-continued

| BERT$_{mt_{IMHO}}$ | .568 | .719 | .804 | .764 | .700 |
| BERT$_{mt_{essay}}$ | .563 | .735 | .811 | .773 | .710 |

Table 3 illustrates F1 scores for Argument Token Detection on the test set. Underlined: highest Accuracy/F1 in group. Bold: highest Accuracy/F1 overall.

In addition to the validation of three separate machine learning approaches with a variety of experiments, the results obtained from the BERTmt$_{essay}$ model that has performed the best (Table 2) were analyzed. According to the confusion matrix, there were three major sources of errors: (a) around 2500 "O-Arg" tokens were wrongly classified as "I-Claim" (b) 2162 "I-Claim" tokens are wrongly classified as "O-Arg", and (c) 273 "I-Premise" tokens were erroneously classified as "I-Claim". Here, (a) and (b) are not surprising given these are the two categories with the largest number of tokens. For (c) examples were examined such as "because of [Walmart's goal of saving money]$_{premise}$, [customers see value in Walmart that is absent from other retailers]$_{claim}$". Here, the premise tokens were wrongly classified as O-Arg tokens. This is probably because the premise appears before the claim, which is uncommon in the utilized training set.

non-arguments classified as arguments: This error occurs often, but it is more challenging for opinions or hypothetical examples that resemble arguments but are not necessarily arguments. For instance, the opinion "that actually makes me feel good afterward . . . " and the hypothetical example "Next, you will not be eating due to your lack of money" are similar to an argument, and the classifier erroneously classifies them as claim. To address this issue, labeled opinions can be used during training to investigate how the model(s) handle opinions vs. arguments during the classification.

missing multiple-claims from a sentence: In many examples, multiple claims appear were observed in a single sentence, such as: "[Some coral can recover from this]$_{claim}$ though [for most it is the final straw.]$_{claim}$". During prediction, the model predicts the first claim correctly but then starts the second claim with an "I-Claim" label, which is an impossible transition from "Arg-O" (i.e., does not enforce well-formed spans). Besides, the model starts the second claim wrongly at the word "most" rather than "for". This indicates the model's inability to distinguish discourse markers such as "though" as potential separators between argument components. This could be explained by the fact that markers such as "though" or "because" are frequently part of an argument claim. Such as, in "[those games do not seem as violent even though they are at the same level]$_{claim}$", "though" is labeled as 'I-Claim'.

investigating run-on sentences: Some sentences contain multiple claims, which are written as one sentence via a comma-splice run-on such as "[Humans in today's world do not care about the consequences]$_{claim}$, [only the money they may gain.]$_{claim}$" which has two claims in the gold annotations but it was predicted as one long claim by a best performing model. Another example is "[The oceans are also another dire need in today's environment]$_{claim}$, each day becoming more filled with trash and plastics.", in which the claim is predicted correctly in addition to another predicted claim starting at the word "each". The model tends to over predict claims when a comma comes in the middle of the sentence followed by a noun. However, in the former example, the adverb "only" that has a "B-Claim" label follows the comma rather than the more frequent nouns.

Such instances add more complexity to understand and model argument structures in middle school student writing.

effect of the multitask learning: The impact of multitask learning was examined and two characteristics were noted. First, the multitask model can identify claims and premises that are missed by the single task model(s), such as: "[many more negative effects that come with social media . . . "]$_{claim}$" that was correctly identified by the multitask model. Second, the clever handling of the back-propagation helps the multitask model to reduce false positives to be more precise. Many non-argumentative sentences, such as: "internet's social networks help teens find communities . . . " and opinions, such as: "take $1.3 billion off $11.3 billion the NCAA makes and give it to players" are wrongly classified as claims by the single task models but are correctly classified as non-argumentative by the multitask model.

Figure 3:
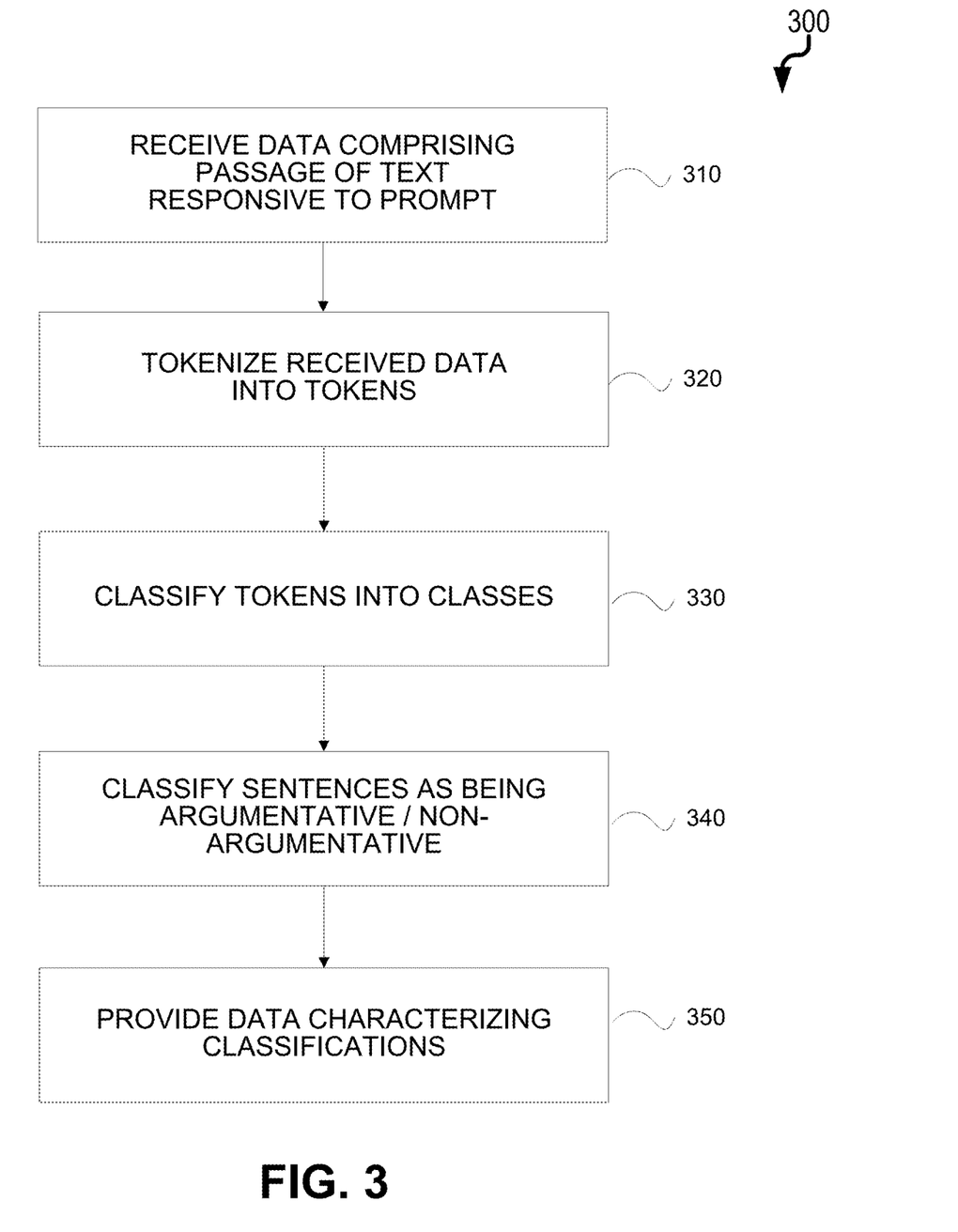
FIG. 3 is a process flow diagram illustrating machine learning-based argument component segmentation.

FIG. 3 is a process flow diagram 300 for machine learning-based argument component segmentation in which, at 310, data is received that comprises a passage of text generated in response to a prompt. The passage of text includes a plurality of sentences. The passage of text is tokenized, at 320, into a plurality of tokens each corresponding to a different word in the passage of text. A first classification head of an adaptive fine-tuned transformer model classifies, at 330, each of the tokens into one of a plurality of classes. A second classification head of the adaptive fine-tuned transformer model classifies, at 340, each of the sentences as either including or not including an argument. Data can then be provided, at 350, which characterizes the classification(s).

Figure 4:
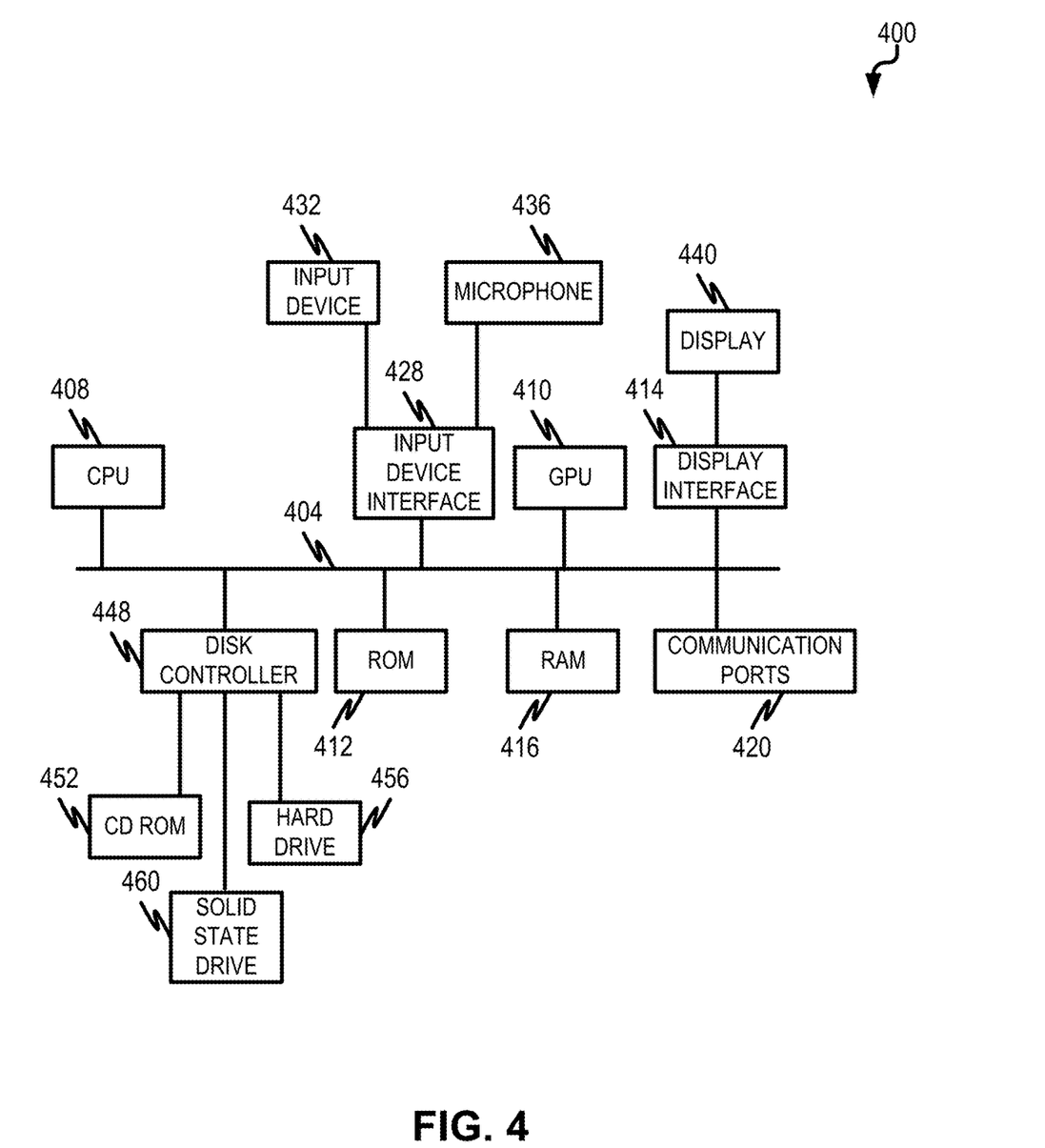
FIG. 4 is a diagram illustrating aspects of a computing device for implementing the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers) and/or a processing system 410 labeled GPU (graphics processing unit), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving data comprising a passage of text generated in response to a prompt, the passage of text comprising a plurality of sentences;
   tokenizing the passage of text into a plurality of tokens each corresponding to a different word in the passage of text;
   first classifying, by a first classification head of an adaptive fine-tuned transformer model, each of the tokens into one of a plurality of classes;
   second classifying, by a second classification head of the adaptive fine-tuned transformer model, each of the sentences as either including or not including an argument; and
   providing data characterizing the first classifying and the second classifying.

2. The method of claim 1, wherein the providing data comprises at least one of: causing the provided data to be displayed in an electronic visual display, transmitting the provided data to a remote computing device, storing the provided data in physical persistence, or loading the provided data into memory.

3. The method of claim 1, wherein the providing data comprises:
   annotating the passage of text with the classifications from the first classifying and the second classifying; and
   causing the annotated passage of text to be displayed in a graphical user interface rendered on an electronic visual display.

4. The method of claim 1, wherein the transformer model comprises:
   a bidirectional encoder representation from transformers (BERT) model.

5. The method of claim 4, wherein the BERT model is first trained using a corpus of text generated by authors above an age.

6. The method of claim 5, wherein the BERT model is second trained using an argumentative corpus of text generated by authors below the age.

7. The method of claim 1, wherein the second classifying classifies each tokenized word into one of five beginning inside out (BIO) classes.

8. A system comprising:
   memory comprising instructions; and
   at least one data processor which, when executing the instructions, result in operations comprising:
      receiving data comprising a passage of text generated in response to a prompt, the passage of text comprising a plurality of sentences;
      tokenizing the passage of text into a plurality of tokens each corresponding to a different word in the passage of text;
      first classifying, by a first classification head of an adaptive fine-tuned transformer model, each of the tokens into one of a plurality of classes;
      second classifying, by a second classification head of the adaptive fine-tuned transformer model, each of the sentences as either including or not including an argument; and
      providing data characterizing the first classifying and the second classifying.

9. The system of claim 8, wherein the providing data comprises at least one of: causing the provided data to be displayed in an electronic visual display, transmitting the provided data to a remote computing device, storing the provided data in physical persistence, or loading the provided data into memory.

10. The system of claim 8, wherein the providing data comprises:
    annotating the passage of text with the classifications from the first classifying and the second classifying; and
    causing the annotated passage of text to be displayed in a graphical user interface rendered on an electronic visual display.

11. The system of claim 8, wherein the transformer model comprises:
    a bidirectional encoder representation from transformers (BERT) model.

12. The system of claim 11, wherein the BERT model is first trained using a corpus of text generated by authors above an age.

13. The system of claim 12, wherein the BERT model is second trained using an argumentative corpus of text generated by authors below the age.

14. The system of claim 8, wherein the second classifying classifies each tokenized word into one of five beginning inside out (BIO) classes.

15. A computer-implemented method for processing a passage of text comprising:
    receiving data comprising a passage of text generated in response to a prompt, the passage of text comprising a plurality of sentences;
    tokenizing the passage of text into a plurality of tokens each corresponding to a different word in the passage of text;

first classifying, by a first classification head of an adaptive fine-tuned transformer model, each of the tokens into one of a plurality of classes;

second classifying, by a second classification head of the adaptive fine-tuned transformer model, each of the sentences as either including or not including an argument; and providing data characterizing the first classifying and the second classifying by:

annotating the passage of text with the classifications from the first classifying and the second classifying; and causing the annotated passage of text to be displayed in a graphical user interface rendered on an electronic visual display.

16. The method of claim 15, wherein the providing data further comprises at least one of: transmitting the provided data to a remote computing device, storing the provided data in physical persistence, or loading the provided data into memory.

17. The method of claim 16, wherein the transformer model comprises:

a bidirectional encoder representation from transformers (BERT) model.

18. The method of claim 17, wherein the BERT model is first trained using a corpus of text generated by authors above an age.

19. The method of claim 18, wherein the BERT model is second trained using an argumentative corpus of text generated by authors below the age.

20. The method of claim 19, wherein the second classifying classifies each tokenized word into one of five beginning inside out (BIO) classes.

* * * * *